US009663048B2

United States Patent
Pichler et al.

(10) Patent No.: US 9,663,048 B2
(45) Date of Patent: May 30, 2017

(54) CONTROL UNIT FOR OPERATING A MOTOR VEHICLE

(71) Applicant: Bayerische Motoren Werke Aktiengesellschaft, Munich (DE)

(72) Inventors: Christian Pichler, Munich (DE); Joachim Froeschl, Herrsching (DE); Martin Hattenkofer, Moosthenning (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 79 days.

(21) Appl. No.: 14/142,105

(22) Filed: Dec. 27, 2013

(65) Prior Publication Data

US 2014/0114498 A1    Apr. 24, 2014

Related U.S. Application Data

(63) Continuation of application No. PCT/EP2012/061980, filed on Jun. 21, 2012.

(30) Foreign Application Priority Data

Jun. 29, 2011   (DE) .................. 10 2011 078 271

(51) Int. Cl.
    *B60R 16/023*  (2006.01)
    *B60W 50/00*   (2006.01)

(52) U.S. Cl.
    CPC ..... *B60R 16/0236* (2013.01); *B60W 50/0098* (2013.01); *B60W 2050/0006* (2013.01)

(58) Field of Classification Search
    CPC ................................. B60R 16/0236

(Continued)

(56) References Cited

U.S. PATENT DOCUMENTS 6,067,586 A * 5/2000 Ziegler ................. G06F 11/277
                                                         710/18
6,757,567 B2 * 6/2004 Campagnolo ........ B62M 25/045
                                                          700/2

(Continued)

FOREIGN PATENT DOCUMENTS

DE          100 44 319 A1    3/2002
DE     10 2007 050 773 A1    4/2009

(Continued)

OTHER PUBLICATIONS

International Search Report dated Aug. 10, 2012 with English translation (seven (7) pages).

*Primary Examiner* — Redhwan k Mawari
*Assistant Examiner* — Anshul Sood
(74) *Attorney, Agent, or Firm* — Crowell & Moring LLP

(57) ABSTRACT

A control unit for operating a motor vehicle includes a basic module and a function module, which is constructed in a secured run-time environment. The control unit includes predefined first and second interfaces, which each couple the basic module and the function module. The basic module is designed for determining one or more function input quantities, depending on at least one operating quantity, and for providing the function input quantities at the first interface. The basic module is further designed for determining control variables of the actuators, depending on one or more output quantities, which are provided at the second interface. The function module is designed for determining the one or more output quantities, depending on the function input quantities provided t the first interface and a predefined quantity of rules, which output quantities characterize an operating strategy from a quantity of predefined operating strategies, and for providing the output quantities at the second interface.

7 Claims, 1 Drawing Sheet

(58) Field of Classification Search
USPC .............................................................. 701/1
See application file for complete search history.

(56) References Cited

U.S. PATENT DOCUMENTS

| | | | |
|---|---|---|---|
| 6,937,933 B1 * | 8/2005 | Jautelat | F02D 11/105 |
| | | | 123/479 |
| 2003/0078699 A1 | 4/2003 | Harms et al. | |
| 2006/0122741 A1 | 6/2006 | Bassiere et al. | |
| 2011/0166726 A1 * | 7/2011 | Fakler | B60K 6/48 |
| | | | 701/22 |

FOREIGN PATENT DOCUMENTS

| | | | | |
|---|---|---|---|---|
| DE | WO-2009053294 A1 * | 4/2009 | ............ | B60W 10/08 |
| DE | 10 2009 011 156 A1 | 8/2010 | | |
| WO | WO 2004/014699 A2 | 2/2004 | | |

* cited by examiner

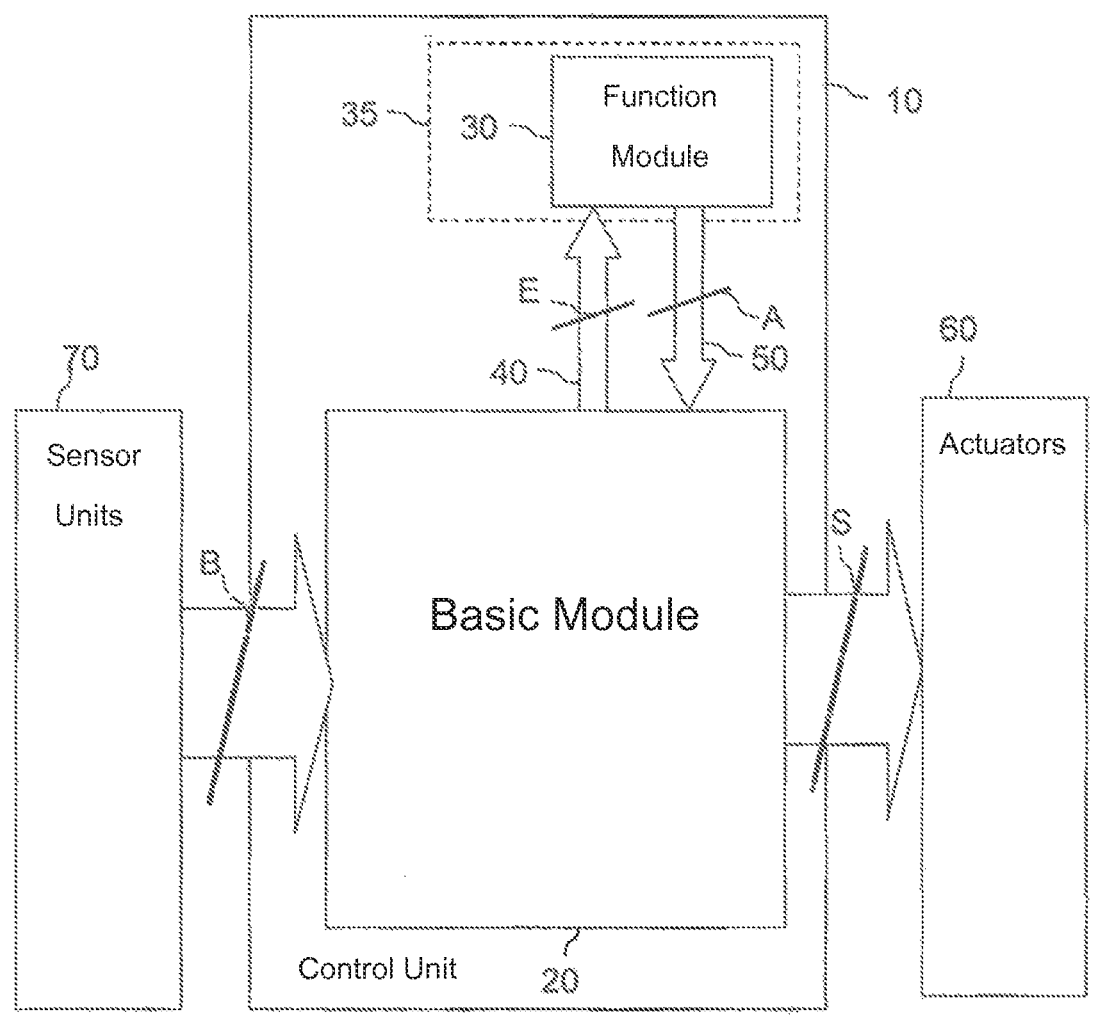

CONTROL UNIT FOR OPERATING A MOTOR VEHICLE

CROSS REFERENCE TO RELATED APPLICATIONS

This application is a continuation of PCT International Application No. PCT/EP2012/061980, filed Jun. 21, 2012, which claims priority under 35 U.S.C. §119 from German Patent Application No. 10 2011 078 271.0, filed Jun. 29, 2011, the entire disclosures of which are herein expressly incorporated by reference.

BACKGROUND AND SUMMARY OF THE INVENTION

The invention relates to a control unit for operating a motor vehicle having a plurality of actuators.

Because of low $CO_2$ emissions, there is considerably increasing interest in battery-operated vehicles, particularly in vehicles having a hybrid drive. Vehicles with a hybrid drive structure have an internal-combustion engine and preferably at least one electric machine as the drive assembly. The drive torque during the driving operation of the hybrid vehicle can therefore be generated by both drive assemblies. For this purpose, an energy management system in the vehicle evaluates data of an engine and chassis control as well as of sensors of the driver assistance systems. Depending on the demand, an activation of the electric machine and/or of the internal-combustion engine may take place in a consumption-optimized, power-optimized or emissions-optimized manner. Even in the case of vehicles which only have an internal-combustion engine as a drive assembly, the significance of the energy management system in the motor vehicle is increasing because of a rising multitude of electric consuming devices and an associated increased power consumption.

It is an object of the invention to provide a control unit for operating a motor vehicle, which control unit contributes to the fact that the vehicle can be reliably operated and to the fact that an energy management in the motor vehicle can be simplified and improved.

This and other objects are achieved by a control unit for operating a motor vehicle having a plurality of actuators. The control unit comprises a basic module and a function module, which is constructed in a secured run-time environment. Furthermore, the control unit comprises a specified first and a second interface which each couple the basic module and the function module. The basic module is designed for determining one or more function input quantities, depending on at least one operating quantity, and for making the function input quantities available at the first interface. In addition, the basic module is designed for determining control variables of the actuators, depending on one or more output quantities made available at the second interface. The function module is designed for determining, depending on the function input quantities made available at the first interface and a specified multitude of rules, the one output quantity or the output quantities which characterize an operating strategy from a multitude of specified operating strategies, and make available the output quantities at the second interface.

The run-time environment is a software program which is implemented together with an application program which cannot communicate directly with an operating system. The run-time environment has the effect that the application program can be implemented on a respective processor platform in that it mediates between the application program and the operating system.

In this case, the processor platform is the totality of the hardware used for the program implementation, particularly the actual microprocessor and/or microcontroller as well as volatile and non-volatile memories which are used for storing data during a program implementation. The secured run-time environment permits a protected implementation of programs. In this case, the programs are shielded from an additional system such that the implementation of the programs has no undesirable effect on the additional system. The secured run-time environment is also called a sandbox. A formation of the function module in the secured run-time environment makes it possible that the program code of the function module ca be implemented in a manner shielded from the basic module, so that the implementation of the program code of the function module has no undesirable effects on basic module, for example, in the form of a memory corruption and/or of faulty jump instructions. This also makes it possible that the program code of the function module can be changed independently of the basic module. The formation of the function module in the secured run-time environment can also make it possible that the program code for the function module can be transmitted to the control unit independently of a program code of the basic module by an appropriately designed programming device.

The respective operating quantity may comprise a measured quantity or a state quantity or a further quantity derived from measured quantities and/or state quantities. The respective operating quantity may characterize an operating state, a driving state and/or environmental state. The determination of the at least one function input quantity preferably takes place such that the at least one function input quantity characterizes a system behavior of the motor vehicle independently of a current sensor configuration. Such an abstraction of the at least one function input quantity advantageously makes it possible that, in the case of a change of the sensor configuration, only the determination of the at least one function input quantity has to be changed, but not the operating strategy and/or the multitude of rules. Analogously, the at least one output quantity characterizes a desired system behavior, which can be implemented by way of the actuators. The at least one output quantity is therefore preferably independent of an actuator configuration.

The determination of the output quantities which each characterize an operating strategy, depending on the multitude of specified rules, makes it possible to indicate an abstract function model of the motor vehicle in a simple manner independently of a sensor and/or actuator configuration. This can contribute to simplifying and improving a serviceability of at least a part of the control system and/or automatic control system of the vehicle. In addition, it becomes possible that the operating strategies can easily be adapted, improved and/or further operating strategies can very easily be added. This can, in turn, contribute to reducing a fault probability in the development of the function model, to lowering development costs and/or to increasing a reliability of the motor vehicle. Furthermore, this can contribute to reducing a complexity of the control system and/or automatic control system of the motor vehicle and/or, while the complexity remains the same, to expanding a functionality of the control system and/or automatic control system of the motor vehicle.

By way of the operating strategy, preferably the provision type of the required energy is specified and/or a maximally allotted energy fraction of the provided energy is in each case specified for users. For the motor vehicle, operating strategies can be specified which can be assigned to different hierarchical levels of the energy distribution in the motor vehicle. The operating strategy may concern individual components of the motor vehicle, for example, a component for converting energy, such as a generator. In addition, the operating strategy may relate to a unit having several components of the motor vehicle, for example, to a low-voltage onboard power supply system of the motor vehicle. The operating strategy may further relate to a partial system of the motor vehicle, which comprises several units, such as an overall onboard power supply system of the motor vehicle, which comprises the low-voltage onboard power supply system and a high-voltage onboard power supply system. A first operating strategy may, for example, be that a hybrid drive device of a hybrid drive vehicle is operated purely electrically. A second operating strategy may, for example, be that the hybrid drive device is operated only by the internal-combustion engine. A third operating strategy may, for example, be that the hybrid drive device is operated in a mixed operation. A fourth operating strategy may, for example, be that the motor vehicle is operated in a recuperation operation.

In an advantageous further development, the function module is designed for determining the at least one function input quantity depending on a specified aggregation function. In this case, specified operating quantities can be assigned to a specific group and, depending on the aggregation function, generalized information can be determined concerning the entire group. One example of the above is a determination of an average value. For example, an average charging state can be determined depending on a respective charging state of energy accumulators in the motor vehicle. Advantageously, the determination of the function input quantities can therefore take place in a very simple manner. In addition, it also becomes possible to relate quantities determined in this manner simply to specified reference quantities in order to obtain a suitable decoupling of the function input quantities flora the sensor configuration of the motor vehicle.

In a further advantageous development, the multitude of rules has rules comprising conditional instructions. Colloquially, such rules are also called "if-then" conditions. This permits the describing of the function model by use of a small multitude of simple language elements and/or syntax. As a result, the function model may be simpler and more comprehensible, whereby an adaptation and/or a fault finding can be carried out significantly more easily.

In a further advantageous development, the secured run-time environment comprises a virtual machine.

In a further advantageous development, the secured run-time environment is designed for implementing bytecode. The bytecode comprises a specified multitude of commands for a virtual machine. When compiling a source text of some programming languages or environments, such as Java, a machine code is not established directly, but rather an intermediate code, bytecode, is established. This code is preferably independent of a real hardware platform and is often relatively compact in comparison to the source code.

Other objects, advantages and novel features of the present invention will become apparent from the following detailed description of one or more preferred embodiments when considered in conjunction with the accompanying drawing.

BRIEF DESCRIPTION OF THE DRAWING

FIG. 1 is a schematic block diagram of an embodiment of the control unit for operating a motor vehicle.

DETAILED DESCRIPTION OF THE DRAWING

The control unit 10 is arranged in the motor vehicle. The motor vehicle may, for example, have a hybrid drive. Several operating strategies may be specified for the operation of the motor vehicle. By means of the respective operating strategy, for example, the manner of providing the required energy is specified and/or an energy fraction of the provided energy maximally in each case allotted to consuming devices in the vehicle can be specified.

The control unit 10 has, for example, a hardware platform with a microprocessor unit. The microprocessor unit is the totality of the hardware used for the program implementation, particularly the actual microprocessor and/or microcontroller as well as volatile and non-volatile memories, which are used for storing the data during the program implementation.

Based on the hardware platform, the control unit 10 has, for example, a basic module 20 and a function module 30 which are designed, for example, as software modules. The function module 30 is constructed in a secured run-time environment. For this purpose, the secured run-time environment comprises a virtual machine 35. The secured run-time environment can be generated, for example, by virtualization. The virtualization permits the creation of an implementable image of a physical computer system in a program code, in that it is embedded as a virtual machine in a host system and can be implemented therein as a guest system.

The secured run-time environment may, for example, be designed for implementing bytecode.

As an alternative or in addition, it is also contemplated that the secured run-time environment comprises an interpreter. In this context, an interpreter is a computer program which, in contrast to assemblers or compilers, does not convert a program source code directly to a file implementable on the system, but reads in, analyzes and implements the source code. The analysis of the source code takes place during the run-time of the program.

The control unit 10 further has a specified first interface 40 and a second interface 50, each of which is preferably designed as a software interface.

The motor vehicle has a plurality of sensor units 70 and actuators 60. For activating the actuators 60, respective control variables S can be specified. The sensor units 70 are each designed for detecting and/or determining one or more operating quantities B of the motor vehicle. For a measured-data acquisition, the sensor units 70 may, for example, each have one or more sensors. Furthermore, the sensor units 70 may be designed for determining state quantities or further quantities, for example, as a function of the respective measured quantities.

The respective operating quantity B may, for example, be representative of a power consumption, an accelerator pedal position, a rotational engine speed, an engine load, an exhaust gas composition, an engine temperature, a transmission ratio, a driving speed, a rotational wheel speed, a steering angle, a rotation rate (gear torque), a distance from the vehicle driving ahead or an obstacle, etc.

The operating quantities B detected and/or determined by the respective sensor units 70 can be supplied to the basic module 20.

The basic module 20 is designed for, depending on at least one operating quantity B, determining one or more function input quantities E and making the function input quantities available at the first interface 40. For example, the basic module 20 may be designed for determining the at least one function input quantity E depending on a specified aggregation function.

The respective operating quantity may represent, for example, a current torque output of a respective electric driving machine of the motor vehicle. In the event that the motor vehicle has several electric driving machines, for example, two or four, for example, an average torque output of all electric driving machines in the motor vehicle can be determined.

The function module 30 is designed for determining, depending on the function input quantities E made available at the first interface 40 and depending on a specified multitude of rules, one output quantity or the output quantities A which characterize an operating strategy from a multitude of specified operating strategies. Furthermore, the function module 30 is designed for making available the output quantities A at the second interface 50.

The basic module 20 is designed for determining, depending on the at least one output quantity A, which is provided at the second interface 50, control variables S of the actuators 60. As a function of the determined control variables S, the actuators 60 can be activated.

For providing a program code for the function module 30, for example, in a case of a program development, the rules can be compiled by way of a compiler to form a parameter set, for example, the bytecode for the virtual machine 35 or a tabular presentation. This parameter set can be transmitted to the control unit. In particular, this parameter set can transmitted to the control unit, independently of the program code for the basic module.

This parameterization of the rules advantageously permits the processing of also complex logical functions by the control unit 10.

LIST OF REFERENCE SYMBOLS

10 Control unit
20 Basic module
30 Function module
35 Virtual machine
40 First interface
50 Second interface
60 Actuators of the motor vehicle
70 Sensor units of the motor vehicle
A Output quantity
B Operating Quantity
E Function input quantity
S Control variable The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A control unit for operating a motor vehicle equipped with a plurality of actuators and sensors, the control unit comprising:
   one or more processors and associated memory configured to comprise:
      a basic module and a function module, the function module being constructed in a secured run-time environment; and
      predefined first and second interfaces, each coupling the basic module and the function module;
   wherein the basic module is configured to:
      determine one or more function input quantities based on at least one operating quantity received from at least one of the sensors;
      provide the one or more function input quantities to the function module via the first interface;
      determine control variables of the actuators based on one or more output quantities received from the function module via the second interface;
   wherein the function module is configured to:
      determine the one or more output quantities based on the one or more function input quantities received from the basic module via the first interface and a predefined quantity of rules, wherein the one or more output quantities characterize an operating strategy from a quantity of predefined operating strategies; and
      provide the one or more output quantities to the basic module via the second interface.

2. The control unit according to claim 1, wherein the basic module is further configured to execute:
   a determination of at least one function input quantity depending on a predefined aggregation function.

3. The control unit according to claim 2, wherein the quantity of rules has rules which comprise conditional instructions.

4. The control unit according to claim 1, wherein the quantity of rules has rules which comprise conditional instructions.

5. The control unit according to claim 1, wherein the secured run-time environment comprises a virtual machine.

6. The control unit according to claim 5, wherein the secured run-time environment is configured to implement bytecode.

7. The control unit according to claim 1, where the secured run-time environment is configured to implement bytecode.

* * * * *